United States Patent [19]

Yasukawa et al.

[11] Patent Number: 4,849,019

[45] Date of Patent: Jul. 18, 1989

[54] PAN-RELEASING TYPE OIL COMPOSITION

[75] Inventors: Takuji Yasukawa; Tsutomu Nishide; Daisuke Yasumura, all of Ibaraki, Japan

[73] Assignee: Kao Corporation, Tokyo, Japan

[21] Appl. No.: 176,634

[22] Filed: Apr. 1, 1988

[30] Foreign Application Priority Data

Apr. 8, 1987 [JP] Japan .................................. 62-86114
Sep. 28, 1987 [JP] Japan ................................ 62-243494

[51] Int. Cl.$^4$ .............................................. C08L 91/00
[52] U.S. Cl. .................................. 106/244; 426/609; 426/811
[58] Field of Search ................. 106/244; 426/609, 811

[56] References Cited

U.S. PATENT DOCUMENTS

| | | | |
|---|---|---|---|
| 3,108,015 | 10/1963 | Thompson | 117/134 |
| 4,023,912 | 5/1977 | Mahler et al. | 106/244 |
| 4,108,678 | 8/1978 | Szuhaj et al. | 106/244 |
| 4,127,419 | 12/1978 | Szuhaj et al. | 106/244 |
| 4,155,770 | 5/1979 | Doumani | 426/609 |
| 4,163,676 | 8/1979 | Konigsbacher | 106/244 |
| 4,192,898 | 3/1980 | Hanson, Sr. | 426/609 |
| 4,211,802 | 7/1980 | Carey | 426/609 |
| 4,339,465 | 7/1982 | Strouss | 426/609 |
| 4,524,085 | 6/1985 | Purves et al. | 426/609 |
| 4,528,201 | 7/1985 | Purves | 426/609 |
| 4,547,388 | 10/1985 | Strouss | 426/609 |

FOREIGN PATENT DOCUMENTS

| | | |
|---|---|---|
| 0141442 | 5/1985 | European Pat. Off. . |
| 0157531 | 10/1985 | European Pat. Off. . |
| 1113241 | 5/1968 | United Kingdom . |
| 2002806 | 2/1979 | United Kingdom . |
| 2149811 | 6/1985 | United Kingdom . |

*Primary Examiner*—Paul Lieberman
*Assistant Examiner*—Willie J. Thompson
*Attorney, Agent, or Firm*—Flynn, Thiel, Boutell & Tanis

[57] ABSTRACT

A pan-releasing oil composition comprises fats and oils and 0.1 to 10 percent by weight, based on the entire composition, of a phospholipid mixture in which the sum total of contents of phosphatidic acid and/or a salt of phosphatidic acid and lysophosphatidic acid and/or a salt of lysophosphatidic acid ranges from 15 to 100 percent by weight based on the weight of the total phospholipids.

9 Claims, No Drawings

4,849,019

PAN-RELEASING TYPE OIL COMPOSITION

BACKGROUND OF THE INVENTION

1. Field of the Invention

The present invention relates to a pan-releasing type oil composition. The invention relates more particularly to a oil composition which is excellent in the function of preventing food materials from sticking to a cooking tool, a dry sand mold, a roof plate, etc. at the time of food heat-cooking, and is free from the browning and coloring of phospholipids due to heating or the emission of a bad smell caused by the thermal decomposition and denaturation of the phospholipids.

2. Description of the Prior Art

At the time of manufacture of cakes and breads or heat-cooking of roasts and fries, fats and oils are used for the purpose of preventing food materials from sticking to a cooking tool, a dry sand mold, a roof plate, etc. after heat-baking. Heretofore, it is known that among various surface active substances, only lecithin is specifically effective for the separation of food materials which tend to give rise to the sticking by heating, such as sponge cake dough and eggroll stuff. Fats and oils in which soybean lecithin is added to and dissolved in vegetable oils have been used as pan-releasing oils.

In such a case, the lecithin is a phospholipid mixture having phosphatidyl choline, phosphatidyl ethanolamine, etc. for its main ingredients. The representative is lecithin obtained by extraction or purification from soybeans or egg yolk.

Natural lecithins such as the soybean lecithin, yolk lecithin, etc. are very unstable substances; they present browing phenomena and are colored dark brown when heated to temperatures above 150° C. even if they are in a state where they are protected by fats and oils. Further, they suffer the disadvantage that they emit bad smells or offensive smells arising from decomposition products and denaturation products of lecithin. Accordingly, their application methods and amounts of them used are considerably restricted.

With the object of reforming lecithin, hydroxylated lecithin is used as a pan-releasing type oil (U.S. Pat. No. 3,661,605), and lecithin with HLB in a specific range is used (U.S. Pat. No. 3,896,975). All of these prior arts, however, do not aim at the improvement of the above-described disadvantages (coloring and emission of bad smells or offensive smells) of lecithin.

Meanwhile, for the purpose of preventing lecithin from browning by heating, succinic acid or sodium succinate is mixed (Published Examined Japanese Patent Application No. 48520/86), acidic amino acid and basic amino acid are mixed (Published Unexamined Japanese Patent Application No. 126206/79), or sodium glutamate is mixed (Published Unexamined Japanese Patent Application No. 127408/79). However, these prior arts do not lead to the substantial obviation of the aforesaid disadvantages.

SUMMARY OF THE INVENTION

The inventors have made earnest studies in order to obtain a food separation type oil which is excellent in food separation effect as a requisite, free from coloring and the emission of a bad smell at the time of heating, and widely applicable. As a result, they have discovered a pan-releasing oil composition having the constitution mentioned later, and completed the present invention.

As described previously, natural lecithins such as soybean lecithin, yolk lecithin, etc. have phospholipids such as phosphatidyl choline, phosphatidyl ethanolamine, etc. for their main ingredients. Nitrogen-containing compounds such as choline, ethanolamine, etc. contained therein are very unstable to heat; they are readily colored and emit bad smells when heated. The inventors have discovered that the coloring and emission of bad smells at the time of heating can be greatly modified with an excellent food separation capacity by decreasing the contents of phosphatidyl choline and phosphatidyl ethanolamine in phospholipids and increasing the contents of phosphatidic acid and lysophosphatidic acid to above the prescribed contents by enzyme treatment (treatment with phospholipase D and phospholipase $A_2$), fractional treatment, etc. using the natural lecithins as starting materials.

The preventing invention is based on such finding.

Namely, the present invention relates to a pan-releasing oil composition which contains in fat and oil 0.1 to 10% by weight of a phospholipid mixture wherein the sum of the content of phosphatidic acid or/and a salt of phosphatidic acid and the content of lysophosphatidic acid or/and a salt of lysophosphatidic acid is more that 15% by weight, preferably ranges from 30 to 100% by weight, in the total phospholipid.

In the invention, a pan-releasing oil composition comprises fats and oils and 0.1 to 10 percent by weight, based on the entire composition, of a phospholipid mixture in which the sum total of contents of phosphatidic acid and/or a salt of phosphatidic acid and lysophosphatidic acid and/or a salt of lysophosphatidic acid ranges from 15 to 100 percent by weight based on the weight of the total phospholipids.

The composition essentially comprises 0.1 to 10 percent by weight of the phospholipid mixture and the balance of fats and oils and optionally a third component such as an anti-oxidant, an emulsifier, ethyl alcohol and a flavor.

It is preferable that a composition comprises 90 to 99.9 percent by weight of the fats and oils and 0.1 to 10 percent by weight of the phospholipid mixture.

In addition, the composition may further comprise an anti-oxidant such as tocopherol and a spice extract, an emulsifier such as a sucrose ester with an aliphatic acid, sorbitan ester with an aliphatic acid, a glyceride and propylene glycol ester with an aliphatic acid(s), to make the phospholipid more soluble, and/or a flavor.

The amount of the total phospholipid means the amount of phospholipids in the form of acetone-insoluble matters described in the Food Additive Regulation Papers of Japan.

Among the salts are counted sodium, potassium, calcium, magnesium, aluminum and ammonium.

The phospholipid mixture having the specific composition prescribed in the invention can be obtained by treatment methods such as decomposition of phosphatidyl choline and phosphatidyl ethanolamine, namely formation of phosphatidic acid and lysophosphatidic acid, with enzymes using natural lecithins as starting materials; solvent fractionation thereof; fractionation by ion exchange column and silicate column; electrodialysis; etc.

Especially, a method is simplest to use and most effective which comprises selectively decomposing phosphatidyl choline and phosphatidyl ethanolamine in soybean lecithin and yolk lecithin using phospholipase D abundantly present in cabbage, etc. thereby decreasing the content of them and increasing the content of phosphatidic acid or/and sodium, calcium and other salts thereof.

The phospholipid mixture thus obtained according to the invention is admixed in an amount of 0.1-10% by weight, preferably 0.5-5% by weight, with fat and oil, whereby an excellent pan-releasing oil composition can be obtained which is excellent in the objective food separation and free from the coloring and bad smell at the time of heating. Incidentally, the amount of the phospholipid mixture compounded is the amount of phospholipids in the form of acetone-insoluble matters. As aforesaid, the acetone-insoluble matters define the total phospholipid, which is in accordance with the definition of lecithin content described in the Food Additive Regulation Papers of Japan.

Examples of the fat and oil used in the invention include vegetable fats and oils such as soybean oil, rapeseed oil, palm oil, corn oil, cotton seed oil, coconut oil, palm kernel oil, rice oil, sesame oil, safflower oil, high oleic safflower oil, safflower oil, high oleic safflower oil, etc.; animal fats and oils such as beef tallow, lard, fish oil, whale oil, milk fat, etc.; fractionated oils thereof; hydrogenated or esterinterchanged oils thereof; etc. Among them, one or more kinds of fats and oils may be employed.

DESCRIPTION OF SPECIFIC EMBODIMENTS

The effects of the pan-releasing oil composition according to the invention will be described more in detail hereinafter by way of examples and comparative examples. However, the invention is not limited to the examples. Examples 1 to 3 and Comparative Examples 1 to 3.

Using soybean lecithin of high purity (acetone-insoluble content: more than 95%) as a starting material, the soybean lecithin was treated with phospholipase D and phospholipase $A_2$, thereby to obtain three kinds of phospholipid mixtures (Table 1, Samples 1 to 3) in which the content of phosphatidyl choline and phosphatidyl ethanolamine in the total phospholipid is decreased and the content of phosphatidic acid (and calcium salt of phosphatidic acid) and lysophosphatidic acid (and calcium salt of lysophosphatidic acid) is increased. For the purpose of comparison, the compositions of phospholipids of soybean lecithin and yolk lecithin were respectively shown as Comparative Samples 1 and 2 in Table 1.

These phospolipid mixtures were admixed in an amount of 0.1, 0.5, 1.0, 5.0 or 10.0% by weight (acetoneinsoluble content) with rapeseed oil to prepare food separation type oils. Using the respective oil compositions, the cooking of thick eggroll with an iron frying pan was evaluated. For the purpose of comparison, the cooking was evaluated in the same manner on rapeseed oil without the addition of phospholipid mixture.

The results obtained are shown in Table 2.

TABLE 1

Compositions of the phospholipid mixtures of the invention (Samples 1 to 3) and phospholipid mixtures for comparison (Comparative Samples 1 and 2).

| Sample No. | Samples | | | Comparative Samples | |
|---|---|---|---|---|---|
| | 1 | 2 | 3 | 1 | 2 |
| Origin | Soybean lecithin | | | Soybean lecithin | Yolk lecithin |
| Acetone-insoluble content[1] (%) | 97.2 | 96.8 | 96.2 | 95.9 | 96.8 |
| PC content[2] (%) | 13.1 | 0.1 | 0.1 | 29.3 | 71.8 |
| PE content[3] (%) | 18.7 | 10.5 | 0.3 | 21.1 | 15.4 |
| PI content[4] (%) | 18.9 | 23.1 | 11.2 | 15.8 | — |
| PA + LPA content[5] (%) | 15.3 | 31.0 | 56.4 | 11.8 | 0.6 |

Note 1 Acetone-insoluble content:
Lecithin content described in the Food Additive Regulation Papers of Japan.
Note 2 PC content:
Content (% by weight) of phosphatidyl choline in acetone-insoluble matters.
Analytical value by TLC in accordance with Standard Fats and Oils Analytical Test Methods (2.2.8.4.a.86, Phosphorus Composition of Phospholipid) compiled by Japanese Oil Chemistry Association.
Note 3 PE content:
Content (% by weight) of phosphatidyl ethanolamine in acetone-insoluble matters.
Analytical value by TLC in accordance with Standard Fats and Oils Analytical Test Methods (2.2.8.4.a.86, Phosphorus Composition of Phospholipid) compiled by Japanese Oil Chemistry Association.
Note 4 PI content:
Content (% by weight) of phosphatidyl inositol in acetone-insoluble matters.
Analytical value by TLC in accordance with Standard Fats and Oils Analytical Test Methods (2.2.8.4.a.86, Phosphorus Composition of Phospholipid) compiled by Japanese Oil Chemistry Association.
Note 5 PA + LPA content:
Sum of the content of phosphatidic acid (and calcium salt of phosphatidic acid) and the content of lysophosphatidic acid (and calcium salt of lysophosphatidic acid) in acetone-insoluble matters.
Analytical value by TLC in accordance with Standard Fats and Oils Analytical Test Methods (2.2.8.4.a.86, Phosphorus Composition of Phospholipid) compiled by Japanese Oil Chemistry Association.

TABLE 2

Evaluation of the application of pan-releasing oils prepared by admixing the phospholipid mixtures of Table 1 in an amount of 0.1, 0.5, 1.0, 5.0 or 10.0% by weight with rapeseed oil.

| Example and Comparative Example No. | Sample | Amount of phospholipid mixture added (%) | Evaluation of applied cooking[7] | | |
|---|---|---|---|---|---|
| | | | Smell at the time of heating | Scorching[8] | Coloring of fats and and oils after heating |
| Comparative Example 1 | Rapeseed oil (control) | — | ⊚ (no) | 10/10 | ⊚ (no) |
| Example 1 | Sample 1 | 0.1 | ⊚ (no) | 3/10 | ⊚ (no) |
| | | 0.5 | ⊚ (no) | 0/10 | O (almost no) |
| | | 1.0 | O (almost no) | 0/10 | Δ (slightly) |
| | | 5.0 | O (almost no) | 0/10 | Δ (slightly) |
| | | 10.0 | Δ (slightly) | 0/10 | X (fairly) |
| Example 2 | Sample 2 | 0.1 | ⊚ (no) | 2/10 | ⊚ (no) |
| | | 0.5 | ⊚ (no) | 0/10 | O (almost no) |
| | | 1.0 | ⊚ (no) | 0/10 | O (almost no) |
| | | 5.0 | O (almost no) | 0/10 | Δ (slightly) |
| | | 10.0 | O (almost no) | 0/10 | Δ (slightly) |
| Example 3 | Sample 3 | 0.1 | ⊚ (no) | 2/10 | ⊚ (no) |

TABLE 2-continued

Evaluation of the application of pan-releasing oils prepared by admixing the phospholipid mixtures of Table 1 in an amount of 0.1, 0.5, 1.0, 5.0 or 10.0% by weight with rapeseed oil.

| Example and Comparative Example No. | Sample | Amount of phospholipid mixture added (%) | Evaluation of applied cooking[7] | | |
|---|---|---|---|---|---|
| | | | Smell at the time of heating | Scorching[8] | Coloring of fats and and oils after heating |
| | | 0.5 | ⊚ (no) | 0/10 | O (almost no) |
| | | 1.0 | ⊚ (no) | 0/10 | O (almost no) |
| | | 5.0 | O (almost no) | 0/10 | O (almost no) |
| | | 10.0 | O (almost no) | 0/10 | Δ (slightly) |
| Comparative Example 2 | Comparative Sample 1 | 0.1 | Δ (slightly) | 4/10 | Δ (slightly) |
| | | 0.5 | Δ (slightly) | 2/10 | X (fairly) |
| | | 1.0 | X (fairly) | 1/10 | X (fairly) |
| | | 5.0 | X X (remarkably) | 0/10 | X X (remarkably) |
| | | 10.0 | X X (remarkably) | 0/10 | X X (remarkably) |
| Comparative Example 3 | Comparative Sample 2 | 0.1 | Δ (slightly) | 6/10 | Δ (slightly) |
| | | 0.5 | X (fairly) | 2/10 | X (fairly) |
| | | 1.0 | X X (remarkably) | 1/10 | X X (remarkably) |
| | | 5.0 | X X (remarkably) | 0/10 | X X (remarkably) |
| | | 10.0 | X X (remarkably) | 0/10 | X X (remarkably) |

Note 6
Amount (% by weight) of phospholipid mixture added in the form of acetone-insoluble matters.
Note 7
After applying 0.5 g of the pan-releasing oil on an iron frying pan (24 cm), two whole eggs (about 100 g) were roasted in five times to prepare thick eggroll. About 5 minutes were required for the cooking a time.
Note 8
In the repetition of the evaluation of the above-described Note 7 10 times, the number of times when the scorching occurred was shown. For example, 8/10 means that the scorching occurred 8 times out of 10 times.

It is apparent from the results of Table 2 that the pan-releasing oil composition of the present invention is not only free from the scorching at the time of heating and excellent in the pan-releasing effect, but also free or almost free from the coloring and the emission of a smell (bad smell) at the time of heating and widely applicable. It is very suitable for and useful as the pan-releasing oil composition.

We claim:

1. A pan-releasing oil composition which comprises (A) a fat or oil component and (B) 0.1 to 10 percent by weight, based on the entire composition, of a phospholipid mixture in which the sum total of the amounts of phosphatidic acid, salt of phosphatidic acid, lysophosphatidic acid and salt of lysophosphatidic acid ranges from 15 to 100 percent by weight, based on the weight of the total phospholipids.

2. A composition as claimed in claim 1, in which said salt is a sodium, potassium, calcium, magnesium, aluminum or ammonium salt.

3. A composition as claimed in claim 1, in which the sum total of the amounts of phosphatidic acid, salt of phosphatidic acid, lysophosphatidic acid and salt of phosphatidic acid ranges from 30 to 100 percent by weight.

4. A composition as claimed in claim 1, which comprises 90 to 99.9 percent by weight of the fat or oil and 0.1 to 10 percent by weight of the phospholipid mixture.

5. A composition as claimed in claim 1, which comprises 0.5 to 5 percent by weight of the phospholipid mixture.

6. A composition as claimed in claim 1, which further comprises an anti-oxidant, an emulsifier, ethyl alcohol, or a flavor.

7. A composition as claimed in claim 4, which further comprises an anti-oxidant, an emulsifier, ethyl alcohol or a flavor.

8. A composition as claimed in claim 1 in which said phospholipid mixture is prepared by subjecting a lecithin material to enzymatic decomposition by phospholipase D or phospholipase $A_2$.

9. A composition comprising (A) from 90 to 99.9 percent by weight of a fat or oil component useful for cooking and selected from edible vegetable and animal fats and oils and mixtures of them, and (B) from 0.5 to 5 percent by weight of a phospholipid mixture which is prepared by enzymatic decomposition of the acetone-insoluble fraction of lecithin with phospholipase D or phospholipase $A_2$, said phospholipid mixture containing from 30 to 100 percent by weight of phosphatidic acid, salt of phosphatidic acid, lysophosphatidic acid and salt of lysophosphatidic acid.

* * * * *